United States Patent
Kubota et al.

(10) Patent No.: US 7,362,241 B2
(45) Date of Patent: Apr. 22, 2008

(54) VEHICLE PROXIMITY WARNING APPARATUS, METHOD AND PROGRAM

(75) Inventors: Tomoki Kubota, Okazaki (JP); Hideto Miyazaki, Okazaki (JP)

(73) Assignee: Aisin AW Co., Ltd. (JP)

( * ) Notice: Subject to any disclaimer, the term of this patent is extended or adjusted under 35 U.S.C. 154(b) by 189 days.

(21) Appl. No.: 11/254,720

(22) Filed: Oct. 21, 2005

(65) Prior Publication Data

US 2006/0114125 A1 Jun. 1, 2006

(30) Foreign Application Priority Data

Nov. 17, 2004 (JP) .............................. 2004-332627

(51) Int. Cl.
*G08G 1/123* (2006.01)
(52) U.S. Cl. .................... 340/995.1; 340/435; 340/436; 340/995.13; 701/301
(58) Field of Classification Search ............ 340/995.1, 340/901, 435, 436, 425.5, 995.12, 995.13, 340/995.15, 995.2, 995.24; 701/301
See application file for complete search history.

(56) References Cited

U.S. PATENT DOCUMENTS

| | | | |
|---|---|---|---|
| 5,864,771 A | 1/1999 | Yokoyama et al. | |
| 6,014,601 A | 1/2000 | Gustafson | |
| 6,018,697 A | 1/2000 | Morimoto et al. | |
| 6,281,806 B1* | 8/2001 | Smith et al. | 340/901 |
| 6,587,043 B1* | 7/2003 | Kramer | 340/435 |
| 6,731,202 B1* | 5/2004 | Klaus | 340/425.5 |
| 7,047,132 B2* | 5/2006 | Jacobs | 701/301 |
| 2002/0135468 A1 | 9/2002 | Bos et al. | |

FOREIGN PATENT DOCUMENTS

| | | |
|---|---|---|
| GB | 2394076 | 4/2004 |
| JP | 5-238307 | 9/1993 |
| JP | 6-270752 | 9/1994 |

* cited by examiner

*Primary Examiner*—Davetta W. Goins
(74) *Attorney, Agent, or Firm*—Bacon & Thomas, PLLC

(57) ABSTRACT

A vehicle proximity warning apparatus includes a current location detector for detecting a current location of the user's vehicle, point information acquisition processor for acquiring map data, and a light emission processor for driving a light generator, in accordance with the map data and the current location of the user's vehicle, to emit a light beam toward a point to be illuminated in an intersection. The light generator is driven in accordance with the location of the user's vehicle and map data so as to direct the light beam toward the point to be illuminated in the intersection, thereby reliably informing other vehicles and pedestrians of the proximity of the user's vehicle.

11 Claims, 7 Drawing Sheets

| POINT TO BE ILLUMINATED | VEHICLE POSITION | DISTANCE (m) | VERTICAL EMMISSION ANGLE |
|---|---|---|---|
| a (Xs, Ys) | s1 (X1, Y1) | A1 | θ 1 |
| a (Xs, Ys) | s2 (X2, Y2) | A2 | θ 2 |
| a (Xs, Ys) | s3 (X3, Y3) | A3 | θ 3 |
| a (Xs, Ys) | s4 (X4, Y4) | A4 | θ 4 |
| a (Xs, Ys) | s5 (X5, Y5) | A5 | θ 5 |

| DISTANCE (m) | VERTICAL EMMISION ANGLE |
|---|---|
| A1 | θ 1 |
| A2 | θ 2 |
| ⋮ | ⋮ |
| An-1 | θ n-1 |
| An | θ n |

VEHICLE PROXIMITY WARNING APPARATUS, METHOD AND PROGRAM

INCORPORATION BY REFERENCE

The disclosure of Japanese Patent Application No. 2004-332627 filed Nov. 17, 2004, including its specification, drawings and abstract, is incorporated herein by reference in its entirety.

BACKGROUND OF THE INVENTION

1. Field of the Invention

The present invention relates to a vehicle proximity warning apparatus, method and program.

2. Description of the Related Art

Intersections and other road junctions where visibility is poor present danger of an accident between vehicles or between a vehicle and a pedestrian. To avoid such an accident, vehicle proximity warning devices are known, which devices inform other vehicles and pedestrians of the approach of a user's vehicle to an intersection. In one type of such vehicle proximity warning devices, a laser beam is emitted from a laser beam generator mounted in a vehicle such that the road surface is illuminated by the emitted laser beam. When the vehicle is running straight, the laser beam is emitted forward, in the direction in which the vehicle is traveling. When the steering wheel is turned, the laser beam is emitted in the same direction as the direction of steering. The direction of the laser beam is changed depending on the braking distance of the vehicle in the device disclosed, for example, in Japanese Unexamined Patent Application Publication No. 6-270752).

However, in the known vehicle proximity warning apparatus described above, the illumination of the road surface is not based on the distance from the vehicle to the intersection, and thus it is difficult to correctly illuminate the road surface in an intersection.

Therefore, it is difficult to ensure that other vehicles or pedestrians are properly informed of the proximity of the user's vehicle.

SUMMARY OF THE INVENTION

In view of the above-described problem with the conventional vehicle proximity warning devices, it is an object of the present invention to provide a vehicle proximity warning apparatus, a proximity warning method and a vehicle proximity warning program, capable of reliably informing other vehicles and pedestrians of the proximity of the user's vehicle.

To achieve the above object, the present invention provides a vehicle proximity warning apparatus including a current location detector for detecting the current location of the user's vehicle, point information acquisition processing means for acquiring map data, and light emission processing means for driving an illumination generator, based on the map data and the current location of the user's vehicle, the illumination generator emitting a light beam toward a warning point to be illuminated, thereby reliably informing other vehicles and pedestrians of the proximity of the vehicle of the user.

Preferably, the vehicle proximity warning apparatus of the present invention also includes light emission angle setting means for resetting the vertical angle between the emitted light beam and the vertical and the horizontal angle between the emitted light beam and direction of travel of the user's vehicle, periodically as the distance between the user's vehicle and the warning point decreases.

The present invention also provides a method for warning other vehicles and pedestrians of the proximity of a user's vehicle equipped with a light beam generator. The method includes:

(a) detecting the current location of the user's vehicle;

(b) retrieving map information from a database, the retrieved map data being selected on the basis of the detected current location;

(c) calculating, based on the retrieved map data and detected current location, the distance between the detected current location and a warning point located ahead of the user's vehicle;

(d) responsive to a determination that the calculated distance is within a predetermined distance, directing a light beam, e.g. laser, from the light beam generator onto the warning point to illuminate the warning point and thereby warn the other vehicles and pedestrians of the proximity of the user's vehicle approaching the warning point; and (e) repeating steps (a)-(d) and periodically redirecting the light beam, so as to maintain it focused on the warning point, as the distance between the detected current position and the warning point decreases.

The "warning point", as used herein, may be an area on the road surface within an intersection, a road junction or a crossing (e.g. a pedestrian crossing). The "warning point" may be a predetermined point included in the stored map data or may be a point determined on basis of conditions at some point located in advance of the vehicle, e.g. poor visibility at an intersection.

The redirecting is preferably by resetting the vertical angle between the light beam and the vertical and the horizontal angle between the emitted light beam and direction of travel of the user's vehicle.

The present invention also provides a program for operation of the above-described apparatus to implement the above-described method.

DESCRIPTION OF THE PREFERRED EMBODIMENTS

Preferred embodiments of the present invention are described in detail below with reference to the accompanying drawings.

Figure 1A:
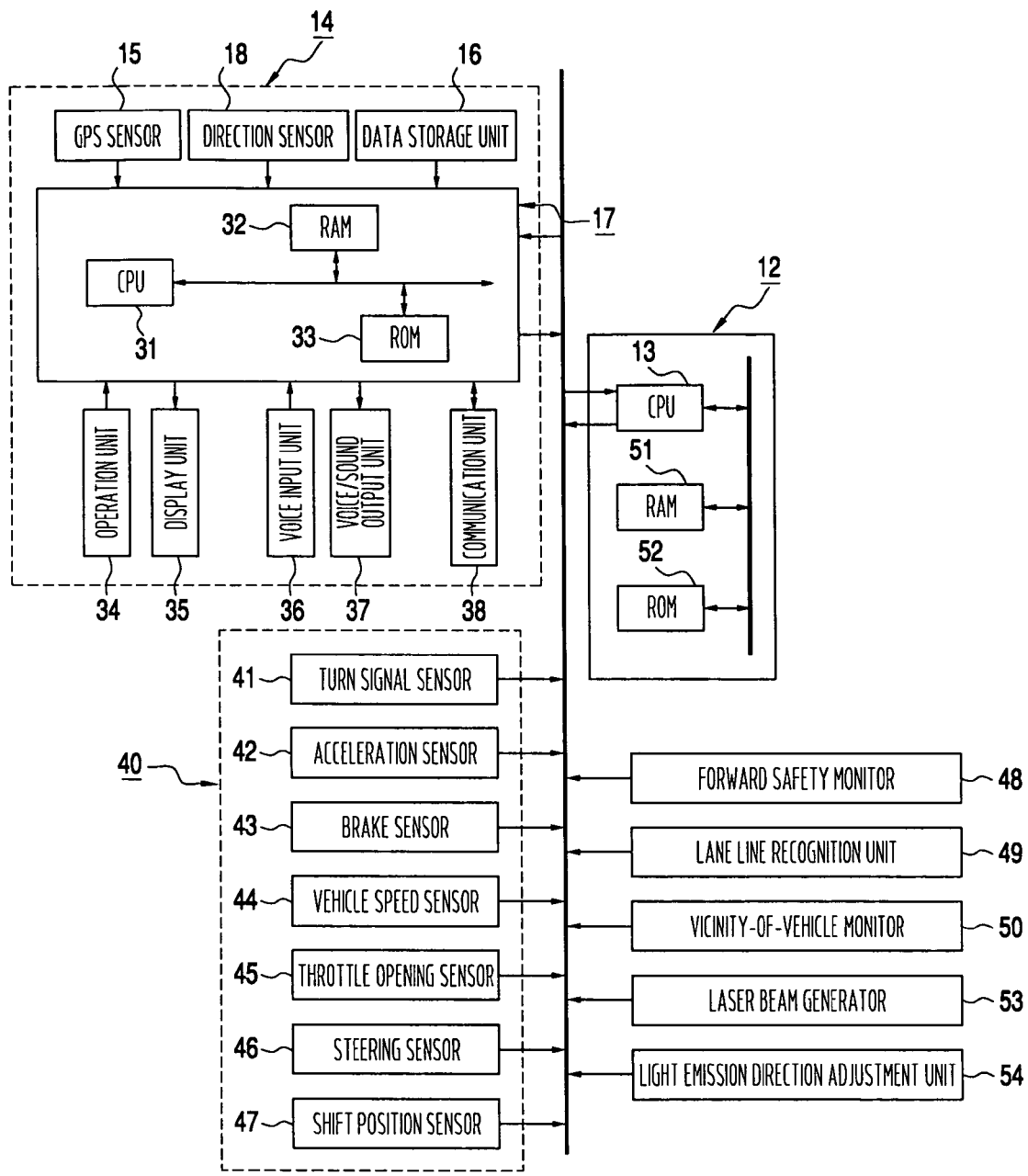
FIG. 1A is a block diagram of a vehicle proximity warning apparatus according to an embodiment of the present invention.
Figure 1B:
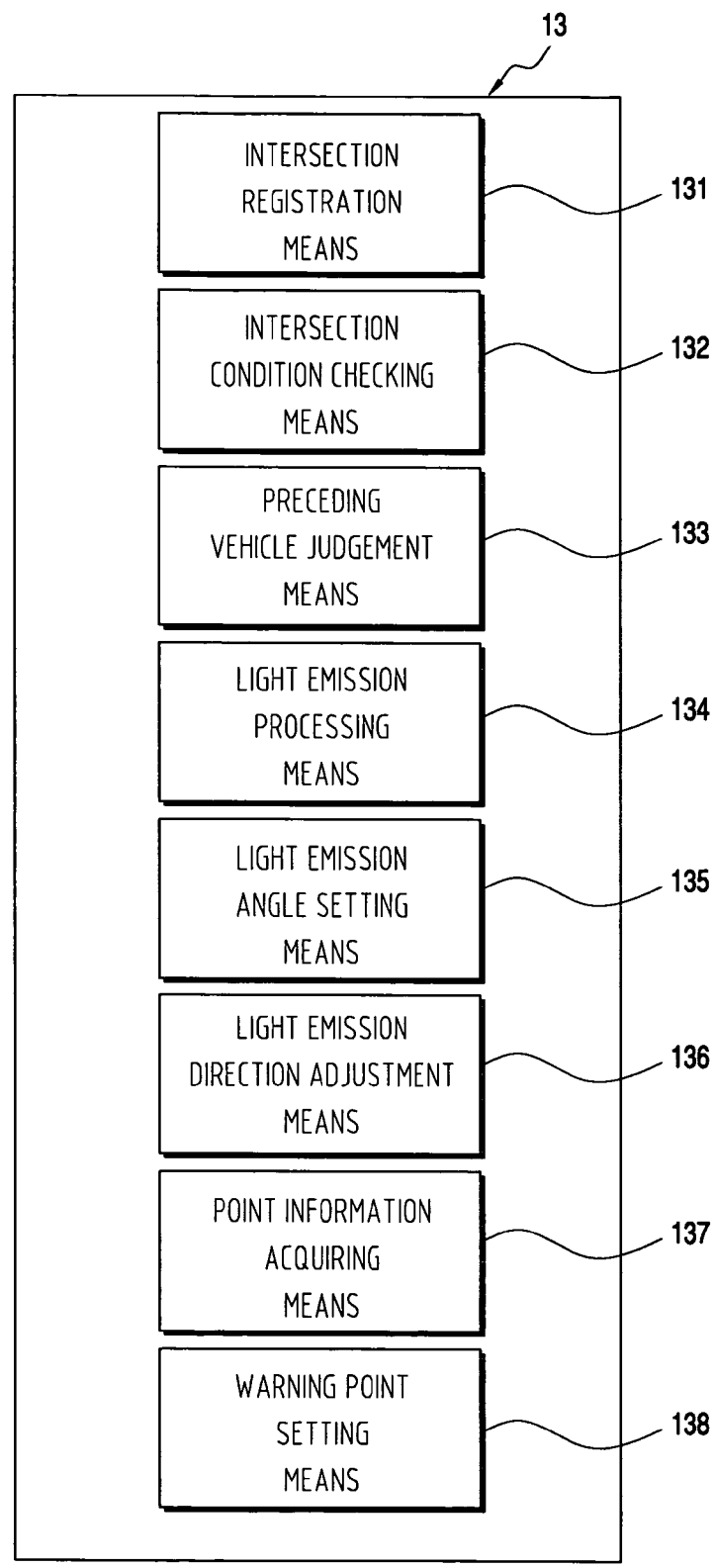
FIG. 1B is a block diagram of the operative components (systems) of computer 13 shown in FIG. 1A.

FIG. 1, shows an information terminal 14, serving as a navigation apparatus installed in a vehicle, as including a GPS sensor 15 serving as a current location detector, a data (information) storage unit 16 in which map data and various other types of data are stored, a navigation unit 17 in the form of a computer that operates utilizing various programs and data to execute a navigational process based on input information, a direction sensor (detector) 18 for detecting the direction of the user's vehicle, a first input unit 34 used by a driver, as operator of the navigation apparatus 14, for input of a command or data, a display unit 35 ("first output unit") for providing information to the driver by display of the information in the form of images on a screen (not shown), a voice input unit 36 with voice recognition ("second input unit") for inputting a command or data by voice, a voice/sound output unit 37 (synthesizer or "second output unit") for providing information to the driver in the form of voice/sound, and a communication unit 38 ("terminal") for transmitting and receiving information to/from a remote source. The GPS sensor 15, the data storage unit 16, the direction sensor 18, the operation unit 34, the display unit 35, the voice input unit 36, the voice/sound output unit 37, and the communication unit 38 are all interconnected with the navigation unit 17.

The navigation unit 17 is also connected to a vehicle controller 12 in the form of a computer which utilizes various programs and data to execute various routines based on input information, a forward safety monitor 48 for monitoring conditions (situation) ahead of the vehicle, a lane line recognition unit 49 for recognizing a lane line indicating a boundary between adjacent lanes, a vicinity-of-vehicle monitor 50 for monitoring the situation in the vicinity of the vehicle, a laser beam generator 53, and a light emission direction adjustment unit 54 for adjusting the emission direction of the laser beam.

The navigation processing unit 17 is also connected to sensors 40 serving, in combination, as a vehicle information detector. The sensors 40 include a turn signal sensor 41 for detecting operation of a turn signal lever by a driver to indicate turning of the vehicle in a lateral direction, an accelerator sensor 42 ("engine load detector") for detecting operation of an accelerator pedal by the driver, a brake sensor 43 serving as a braking detector for detecting operation of a brake pedal by the driver, a vehicle speed sensor 44 for detecting vehicle speed, a throttle opening sensor 45 detector for detecting the throttle opening corresponding to acceleration requested by the driver, a steering sensor 46 for detecting an operation of a steering component, e.g. steering wheel, by the driver, and a shift position sensor 47 for detecting a gear range selected by the driver by operation of, for example, a gear shift lever. The gear ranges selectable by the driver and detectable by the shift position sensor 47 include a neutral range (N), a forward range (D), a low range (L), a reverse range (R) and a parking range (P). Thus, "driver operation information detecting means" includes the turn signal sensor 41, the accelerator sensor 42, the brake sensor 43, the steering sensor 46, and the shift position sensor 47.

The GPS sensor 15 detects the current location from radio signal transmissions received from artificial satellites, and also detects time. Although a GPS sensor 15 is used as the current location detector in the present embodiment, one of or a combination of a distance sensor, a steering sensor, and/or an altimeter (which are not shown in the figure) may be used instead of the GPS sensor 15. The direction sensor 18 may be a gyroscopic sensor, a geomagnetic sensor, or a similar device.

The data storage unit 16 includes a map database including a map data file, in which map data is stored. The data for outputting predetermined information by the voice/sound output unit 37 is also stored in the data storage unit 16. The map data includes intersection data associated with intersections, node data associated with nodes, road data associated with road links, search data prepared for use in searching, and facility data associated with facilities.

The vehicle controller 12 includes a CPU 13 serving as a controller for overall control of the entire of the vehicle, a RAM 51 serving as a first storage medium used as a working memory by the CPU 13 in execution of various routines (programs), a ROM 52 serving as a second storage medium in which various programs such as a control program are stored, and a flash memory (not shown) as a third storage medium used to store various kinds of data and programs. The navigation unit 17 includes a CPU 31 serving as a controller for control of the entire navigation apparatus 14, a RAM 32 serving as a fourth storage medium used as a working memory by the CPU 31 in execution of various routines, a ROM 33 serving as a fifth storage medium in which a control program and various other programs needed to search for a route to a destination and to provide route guidance are stored, and a flash memory (not shown) serving as a sixth storage medium used to store various kinds of programs and data. A MPU may be used instead of the CPU 13 or 31, as the controller.

The data storage unit 16 includes a disk such as a hard drive, a CD, a DVD, or an optical disk (not shown), serving as a seventh storage medium for storing various kinds of data. The data storage unit 16 also includes a head (not shown), such as a read/write head for reading and writing various kinds of data. A memory card serving as an eighth storage medium may also be used.

Instead of storing some or all of programs in the ROM 33 and/or instead of storing some or all of data in the data storage unit 16, programs and/or data may also be stored on a disk or the like. In this case, the programs and/or data may be read from the disk and loaded into the flash memory. This allows the programs and/or data to be updated by replacing the disk. In a case in which the vehicle includes an automatic transmission (not shown) and an automatic transmission controller (not shown), a control program and data used by the automatic transmission controller may also be stored on the disk. Some or all of the programs and/or data described above may be received via the communication unit 38 and stored in the flash memory of the navigation processing unit 17.

The first input unit 34 is used by the driver to correct the current location prior to or at the start of driving of the vehicle, to input the starting point and/or the destination, to input an intermediate point in travel, and/or to operate the communication unit 38. The first input unit 34 may be a keyboard, a mouse, or similar device disposed independently of the display unit 35. Alternatively, the first input unit 34 may be a touch panel which allows input of a command or data by touching or clicking a particular key, switch, or button in the form of images displayed on a screen formed on the display unit 35.

Utilizing the display unit 35, it is possible to display various types of information such as the current location of the user's vehicle, a map, a route determined by search for travel to the destination ("searched route"), guidance information for providing guidance in travel along the searched route, traffic information, the distance to the next intersection on the searched route, direction of travel from the next intersection, guidance information associated with the operation of key/button images, the first input unit 34, the voice input unit 36, an operational menu, and/or guidance information associated with keys. It is also possible to display a multiplexed FM broadcast program.

The voice input unit 36 may be, for example, a microphone (not shown) for input of necessary information by voice. The voice/sound output unit 37 includes a voice synthesizer and a speaker (not shown). The voice/sound output unit 37 outputs information such as information associated with the searched route, guidance information, and traffic information, via a voice synthesized by the voice synthesizer.

The communication unit 38 includes a beacon receiver for receiving various items of information transmitted in the form of a radio wave beacon, an optical beacon and the like from a radio wave beacon apparatus, an optical beacon apparatus and/or the like disposed along a road, wherein the information originates from a road traffic information center serving as a first information provider (not shown) such as a VICS (Vehicle Information and Communication System (registered trademark)) center. The communication unit 38 also includes FM receiver for receiving FM multiplex broadcast signals transmitted from an FM broadcast station. More specifically, the beacon receiver serves to acquire information indicating current traffic conditions such as traffic congestion information, traffic control information, parking lot information, accident information, information indicating availability/congestion of service areas, etc., and the FM receiver allows it to receive general information provided as FM multiplex information such as news, weather reports, etc., in addition to information indicating current traffic conditions. Although the beacon receiver and the FM receiver are shown as integrated into the VICS receiver in the form of a single unit, they may be disposed as separate units.

The communication unit 38 is also capable of receiving information, including traffic information, general information, etc., from additional information centers "second information provider," etc. (not shown). To this end, the communication unit 38 is connected to the information centers via a network (not shown) and, thus, the navigation system includes the navigation apparatus 14, the road traffic information centers, and the network.

The forward safety monitor 48 includes one of or a combination of a radar, such as a laser radar or a millimeter wave radar, and an ultrasonic sensor, whereby the distance between vehicles, the time between vehicles, the closing rate with respect to a preceding vehicle, the closing rate with respect to a stop location. A "stop location" may be a stop sign or light on a non-priority road at an intersection with a priority road, or at a railroad crossing, or an intersection with a red blinking signal, etc. The closing rate with respect to an obstacle, etc. are calculated as proximity-of-vehicle information, based on information as the preceding vehicle, the stop location, obstacles, etc., i.e., the monitored parameters. The vicinity-of-vehicle monitor 50 acquires vicinity-of-vehicle information relating to the vicinity of the vehicle by capturing an image, using a camera such as a CCD camera or a C-MOS camera, of the vicinity of the vehicle, such as an intersection in front of, to the side of, or in the rear of the vehicle, a traffic sign, a signal, and/or a building, and the vicinity-of-vehicle monitor 50 judges the conditions in the vicinity of the vehicle in terms of the state of the intersection, the number of nearby vehicles, the position of a white lane line, the position of a stop line, the position of a traffic sign, the color of the signal, etc.

The basic operation of the navigation system described above is explained below.

First, when the first input unit 34 is operated by the driver to start the navigation apparatus 14, navigation initialization means (not shown) of the CPU 31 initializes a navigation routine. In this navigation initialization process, the current location detected by the GPS sensor 15 and the direction of the user's vehicle detected by the direction sensor 18 are read, and various items of data are initialized. Matching means (not shown) of the CPU 31 executes a matching routine, in which the path (trail) of the current position and the shape or the arrangement of road links corresponding to roads in the vicinity are compared and matched, and the current location is identified by detecting the road link on which the vehicle is currently traveling.

First information acquisition means (not shown) of the CPU 31 performs a first information acquisition process, in which the map data is acquired by reading it from the data storage unit 16 or by receiving it from the information center via the communication unit 38. In the case in which the map data is received from the information center, the first information acquisition means stores the received map data in the flash memory or the like of the navigation unit 17. When the map data is acquired via the communication unit 38, a program may also be acquired together with the map data.

Display processing means (not shown) of the CPU 31 executes a display routine to form a map screen on the display unit 35, i.e. a map of an area in which the vehicle is currently located. On this map, the location and travel direction of the user's vehicle are also displayed. Thus, the driver can drive the vehicle in accordance with the displayed map with the position and the direction of the user's vehicle indicated thereon.

When the driver inputs a destination through operation of the first input unit 34, destination setting means (not shown) of the CPU 31 executes a destination setting routine to set the destination. The starting point may also be input and set, as required, by use of unit 34. One or more points may be registered in advance, and an arbitrary registered point may be selected and set as the destination.

After the destination has been set, route searching means (not shown) of the CPU 31 performs a route search, in which the current location and the destination are read, a route from the current location specified as the starting point to the destination is searched for based on the current location, the destination, and the map data. Among the roads represented by road data included in the map data, roads other than narrow streets are selected in determining the optimum route for travel to the destination and route guidance is provided along the selected route.

Route guidance means (not shown) of the CPU 31 executes a route guidance routine. More specifically, the route guidance means provides route guidance to the driver for the route selected in the route searching process. In the route guidance process, the route display means of the route guidance means executes a route display routine in which route data for the selected route is read, and the selected route is displayed on the map screen in accordance with that route data.

Voice/sound output processing means of the route guidance means executes a voice/sound output routine, as required, in which route guidance associated with the selected route is output as voice/sound from the voice/sound output unit 37. At intersections (crossings or junctions in a T or other form) where visibility is poor, an accident can occur between vehicles or between a vehicle and a pedestrian. To avoid such an accident, when the vehicle is approaching an intersection, the vehicle proximity warning apparatus emits a laser beam from the laser beam generator 53 to illuminate the center of the intersection with the laser beam to reliably inform other vehicles and pedestrians of the proximity of the user's vehicle.

The operation performed by the vehicle proximity warning apparatus to illuminate the center of a crossing with the laser beam is described below with reference to FIGS. 2-8.

First, the point information acquisition means 137 of the CPU 13 (FIG. 1) executes a point information acquiring routine and determines whether a route has been selected by execution of the route search routine performed by the CPU 31. If a route has been selected, map data associated with the selected route is acquired. Intersection registration means 131 of the CPU 13 executes an intersection registering process in which a judgment is made as to whether there is an intersection without a signal on the selected route, and, if such an intersection is detected, the intersection registration means 131 registers that intersection without a signal in the RAM 51.

On the other hand, in a case in which no route has been selected, the point information acquiring means 137 (also referred to herein as "point information acquisition means") reads the current location and acquires map data associated with an area around the current location.

Vehicle operating means (not shown) of the CPU 13 controls various operations involved in driving of the vehicle.

Next, the intersection condition checking means 132 of the CPU 13 executes an intersection checking routine. In the intersection checking routine, a judgment is made as to whether the visibility at an intersection m1 ahead of the vehicle is good. This judgment is made, for example, by determining whether there is a wall of a building or the like close to the intersection m1, based on the information detected by the vicinity-of-vehicle monitor 50, or is made based on information which has been stored in advance as intersection data and which indicates whether the visibility at the intersection m1 is good and/or whether there is a signal at the intersection. The results of determination of whether the visibility at the intersection m1 is good may be learned and registered in the data storage unit 16.

Figure 3:
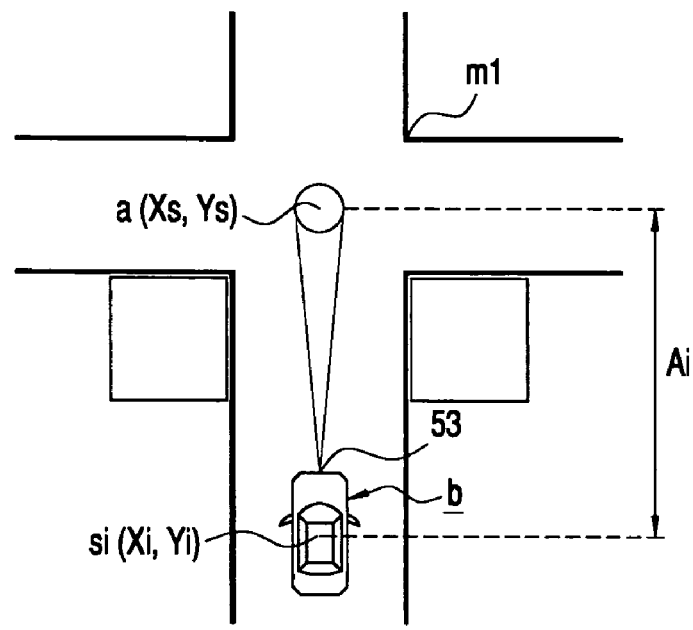
FIG. 3 is an illustration of one example of emission of a laser beam according to the present invention.

In the case in which it is determined that the visibility at the intersection m1 located ahead of the vehicle is poor, preceding vehicle judgment means 133 of the CPU 13 executes a preceding vehicle judging process. In the preceding vehicle judging process, as shown in FIG. 3, when the vehicle b reaches an emission start point that is a predetermined distance A0 (for example, 100 m) before the center of the intersection m1, that is, when a light emission point is reached, the information output of the monitoring by the forward safety monitor 48 or the proximity-of-vehicle monitor 50 is acquired, and a determination is made, based on the information obtained by monitoring, as to whether there is a vehicle in front of (ahead of) the vehicle b, within a range from the current position si(Xi, Yi) (i=1, 2, ..., n) of the vehicle to the intersection m1. If there is no such preceding vehicle, point-to-be-illuminated ("warning point") setting means 138 of the CPU 13 executes a point-to-be-illuminated setting routine, in which a point "a" (Xs, Ys) to be illuminated ("warning point"), stored in advance in the data storage unit 16, is read and is set. The light emission processing means 134 of the CPU 13 executes a light emission routine. That is, based on the current location si(Xi, Yi) of the vehicle and the map data, the laser beam generator 53 is operated to emit a laser beam toward the point "a" (Xs, Ys) ("warning point") to be illuminated. In the present embodiment, although the point a(Xs, Ys) to be illuminated is set at the center of the intersection m1, it may be set at a different location in the intersection. Note that the changing current location si(Xi, Yi) of the vehicle b is calculated taking into account the vehicle speed.

Figure 4:
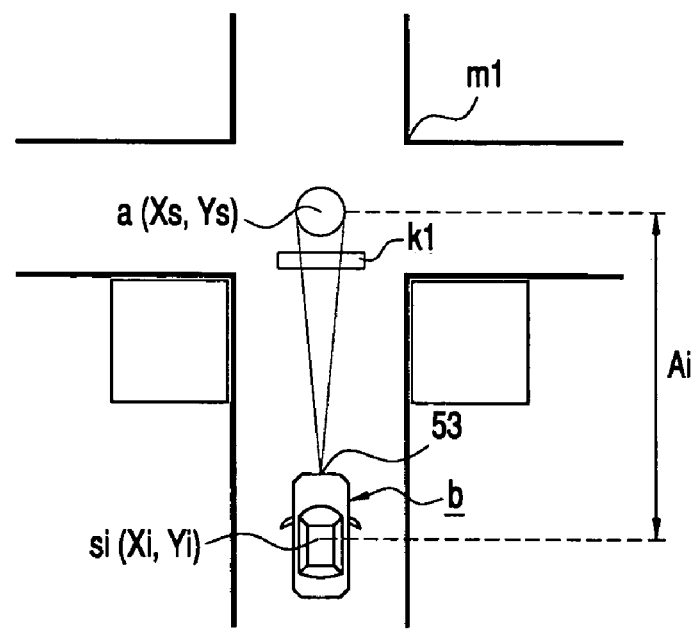
FIG. 4 is an illustration of another example of emission of a laser beam according to the present invention.

In a case in which there is a stop line k1 or a similar traffic sign (not shown in the figure) before the intersection m1, as shown in FIG. 4, an image of the stop line k1 or the traffic sign may be captured using a camera, and matching may be performed based on monitoring information output by the proximity-of-vehicle monitor 50. Based on the result of the matching, the light emission processing means corrects the coordinates $(X_s, Y_s)$ of the point to be illuminated, and the laser beam is directed towards the corrected point "a" (Xs, Ys) to be illuminated.

When the laser beam generator 53 is operated to emit the laser beam, it is necessary to set the vertical light emission angle $\theta i$ (i=1, 2, ..., n) and the horizontal emission angle $\epsilon i$ (i=1, 2, ..., n) at which to emit the laser beam from the laser beam generator 53 toward the corrected point "a" (Xs, Ys) to be illuminated. Herein, the vertical emission angle $\theta i$ refers to the angle between the path of the emitted laser beam and the vertical, and the horizontal emission angle $\epsilon i$ refers to the horizontal angle between the direction of vehicle travel and the path of the emitted laser beam.

Figures 5, 6, 7:
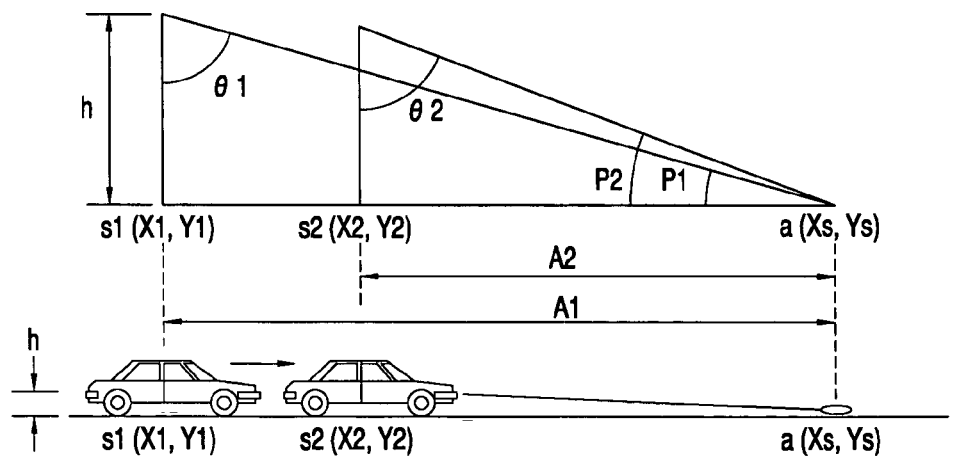
FIG. 5 is a table utilized in determination of a laser beam emission angle according to the present invention.
FIG. 6 is a diagram illustrating laser beam emission angles θ1 and θ2 according to the present invention.
FIG. 7 is a table utilized in a method of determining a laser beam emission angle according to the present invention.

More specifically, light emission angle setting means 135 sets a light emission angle as follows. That is, the corrected point "a" (Xs, Ys) to be illuminated and the position si(Xi, Yi) of the user's vehicle are read, and the distance Ai (i=1, 2, ..., n) from the position si(Xi, Yi) of the user's vehicle to the point "a" (Xs, Ys) to be illuminated is calculated as shown in FIGS. 5 and 6. The light emission angle setting means then calculates the light emission angle $\theta i$ at the vehicle position si(Xi, Yi) for each i, based on the height h above the ground (road surface) at which the laser beam generator 53 is disposed and the distance Ai for each i, in accordance with the following equation.

$$\theta i = \tan^{-1} Ai/h \quad (°)$$

The calculated value is set as the light emission angle $\theta i$. The elevation angle Pi (i=1, 2, ..., n), that is, the angle between the horizontal and a line from the laser beam generator 53 to the point "a" (Xs, Ys) to be illuminated is given by $$Pi = 90 - \theta i \quad (°)$$

Figure 8:
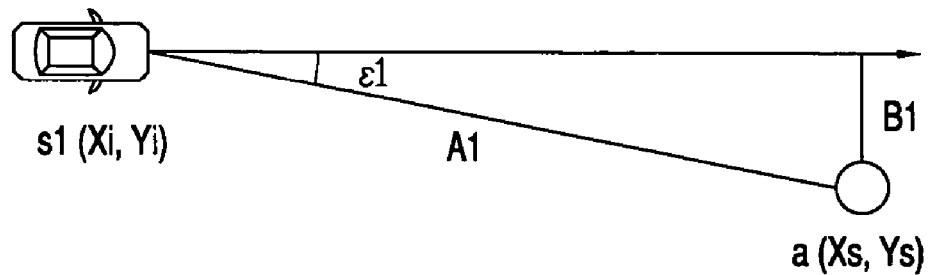
FIG. 8 is a diagram illustrating a laser beam emission angle ε according to the present invention.

As shown in FIG. 8, the deflection Bi (i=1, 2, ..., n), in a direction across the road, between the light path from the current position si(Xi, Yi) to the point "a" (Xs, Ys) to be illuminated and the direction of travel, is given by the following equation.

$$Bi = Ys - Yi$$

Thus, based on the deflection Bi and the distance Ai, the light emission angle setting means calculates the light emission angle $\epsilon i$ according to the following equation.

$$\epsilon i = \sin^{-1} Bi/Ai \quad (°)$$

The calculated value is set as the light emission angle $\epsilon i$. Light emission direction adjustment means 136 then executes a light emission direction adjusting routine whereby, in accordance with the light emission angles θi and εi, the direction of the light beam is adjusted by control of a light emission direction adjustment unit 54.

In the present embodiment, the light emission angle setting means 135 calculates in real time the light emission angle θi based on the distance Ai and the height h and sets the light emission angle according to the calculated value as described above. Alternatively, the light emission angle θi corresponding to the distance Ai may be read from a light emission angle table, such as that shown in FIG. 7, which is stored in advance in the data storage unit 16, and the light emission angle θi may be set to the read value. In another alternative, instead of using the light emission angle table, the light emission angle θi may be calculated as a function f as follows.

$$\theta i = f(Ai)$$

As the vehicle b runs and thus the distance Ai changes, the light emission angles θi and εi are changed in accordance with change in the distance Ai so that the laser beam generator 53 is correctly aimed at the point "a" (Xs, Ys) to be illuminated.

For example, the diameter of the laser beam is set to about 3 mm, and the output power of the laser beam generator 53 is set to 5 mW or less to satisfy the standard of JISC6802 Classes 1, 2, and 3A, so that a human eye is not harmed by being struck by a laser beam.

After the laser beam is emitted toward the point "a" (Xs, Ys) to be illuminated in the intersection m1 in the above-described manner, the light emission processing means 134 makes a determination, based on the current location si(Xi, Yi) of the vehicle and the point "a" (Xs, Ys) to be illuminated, as to whether the vehicle b has passed through the intersection m1. If the vehicle b has passed through the intersection m1, the emission of the laser beam is ended.

In the present embodiment, as described above, the accurate distance Ai from the vehicle b to the intersection m1 is determined based on the position si(Xi, Yi) of the user's vehicle and the map data, and the laser beam is emitted precisely towards the point "a" (Xs, Ys) to be illuminated in the intersection m1.

Thus, it is possible to reliably inform other vehicles and pedestrians of the proximity of the user's vehicle.

Figure 2:
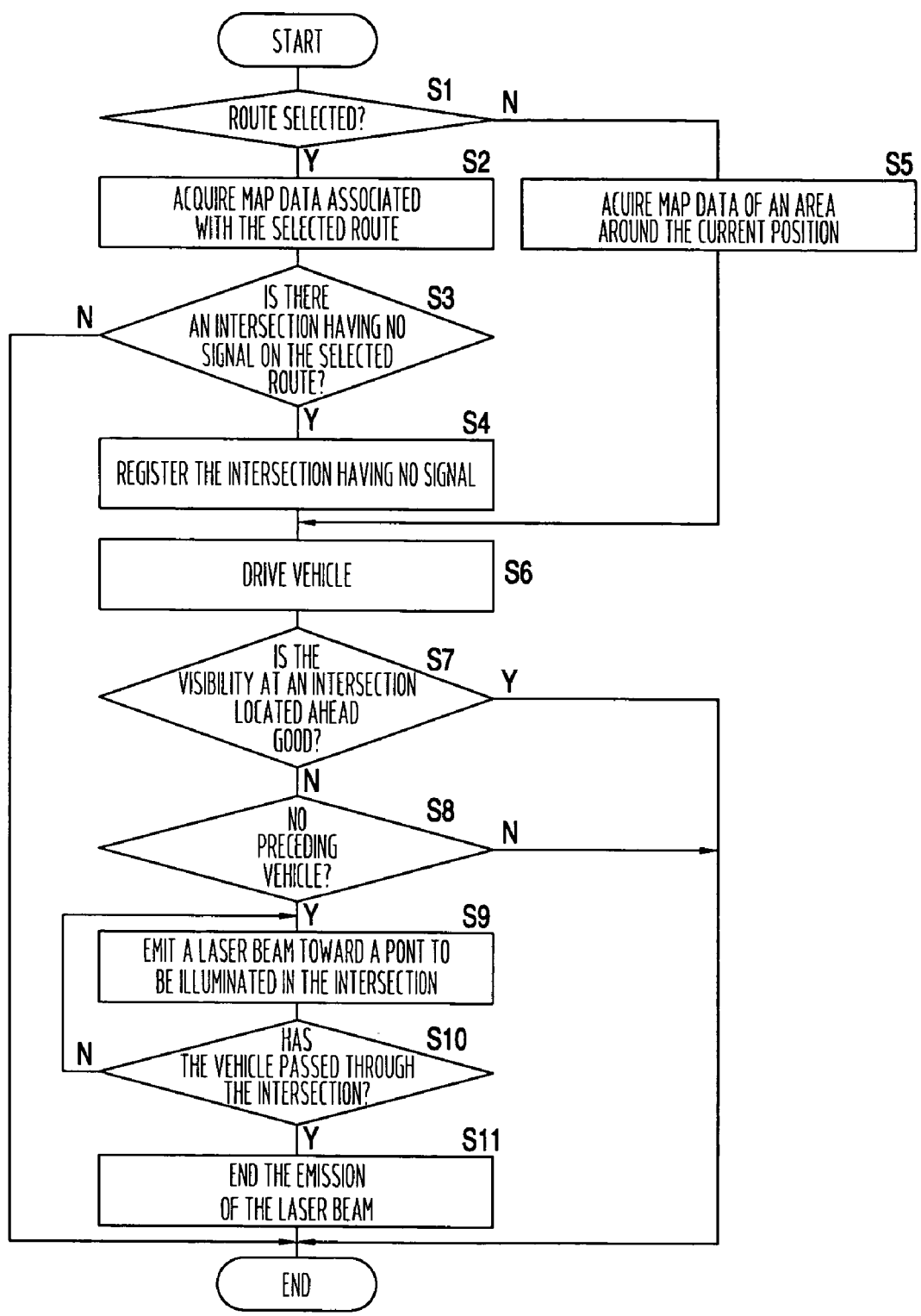
FIG. 2 is a flow chart of a routine for operation of a vehicle apparatus according to an embodiment of the present invention.

The above-described process will now be described in greater detail with reference to the flow chart of FIG. 2.

In step S1, a determination is made as to whether a route has been selected in the route searching process. If a route has been selected, the process proceeds to step S2. However, if no route has been selected, the process proceeds to step S5.

In step S2, map data associated with the selected route is acquired.

In step S3, a determination is made as to whether there is an intersection without a signal on the selected route. If there is an intersection without a signal on the selected route, the process proceeds to step S4. However, if there is no such intersection, the process is ended.

In step S4, the intersection without a signal is registered.

In step S5, map data for an area around (vicinity of) the current position is acquired.

In step S6, the vehicle b is driven.

In step S7, a determination is made as to whether the visibility at the intersection m1 located ahead is good. If the visibility at the intersection m1 located ahead is good, the process is ended. However, if the visibility is poor, the process proceeds to step S8.

In step S8, a determination is made as to whether there is a preceding vehicle. If there is no preceding vehicle, the process proceeds to step S9. However, if there is a preceding vehicle, the process is ended.

In step S9, a laser beam is emitted toward the point "a" (Xs, Ys) to be illuminated in the intersection m1.

In step S10, a determination is made as to whether the vehicle has passed through the intersection m1. If the vehicle has passed through the intersection m1, the process proceeds to step S11. However, if the vehicle has not reached the intersection m1, the process returns to step S9.

In step S11, after the emission of the laser beam is ended, the process is ended.

Figure 10:
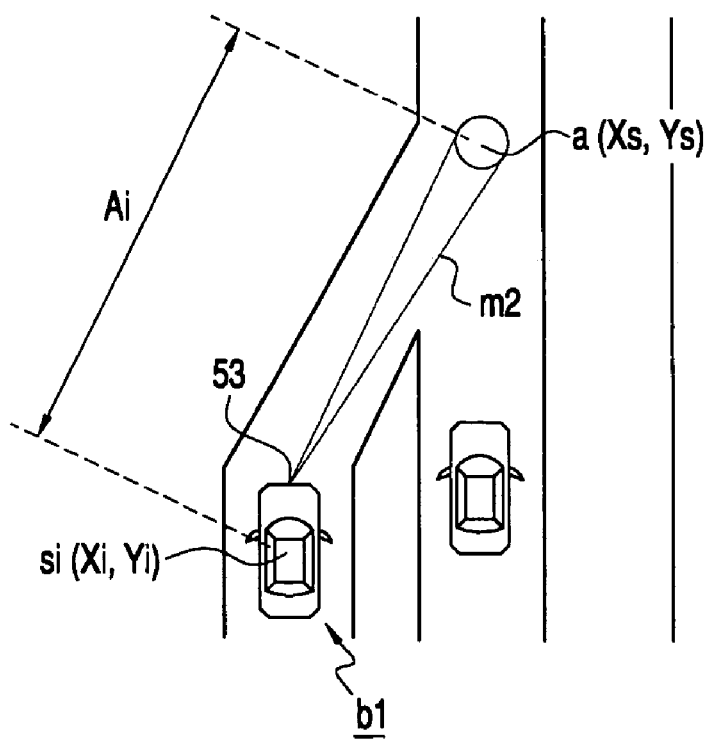
FIG. 10 is a diagram illustrating emission of a laser beam at a merging point according to the present invention.
Figure 9:
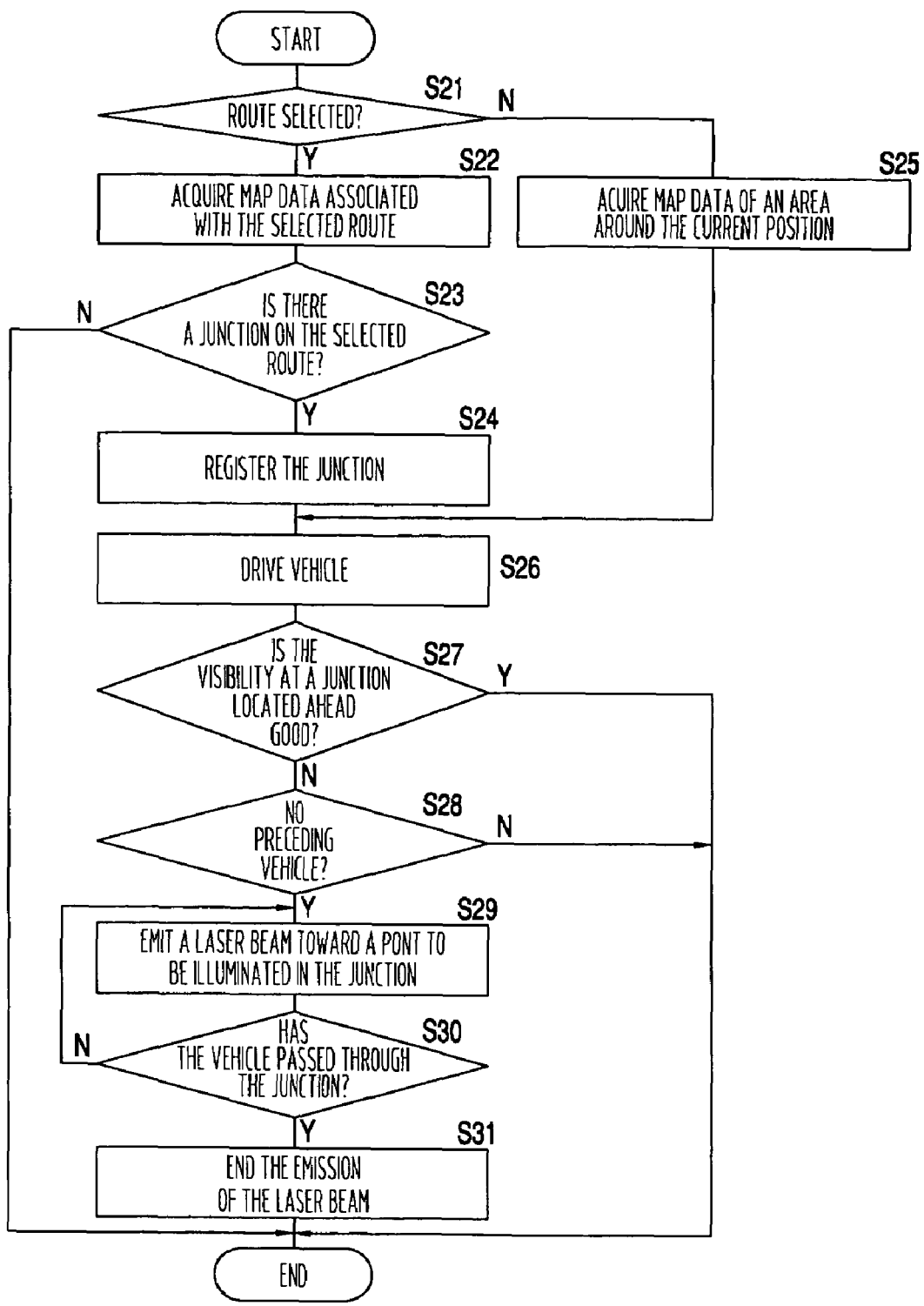
FIG. 9 is a flow chart of a routine for operation of a vehicle proximity warning apparatus according to an embodiment of the present invention.

Now, the operation performed by the vehicle proximity warning apparatus to illuminate the center of an intersection with the laser beam, for the case in which the intersection is a junction, will be described with reference to FIGS. 9 and 10.

First, the point information acquiring means determines whether a route has been selected in the route search performed by the CPU 31 (FIG. 1). If a route has been selected, map data associated with the selected route is acquired. The intersection registration means 131 then executes an intersection registering routine. More specifically, in the intersection registration routine, a judgment is made as to whether there is a junction on the selected route. If a junction is detected on the selected route, the intersection registration means registers the detected junction in the RAM 51.

On the other hand, in a case in which no route has been selected, the point information acquiring means 137 reads the current location map data for an area around (in the vicinity of) the current location.

Thereafter, the vehicle operating means executes programs associated with normal driving.

The intersection condition checking means 132 determines whether the visibility at the junction m2 located ahead of the vehicle is good. This judgment is made, for example, by determining whether there is a wall of a building or the like close to the junction m2, based on the information for the vicinity of the vehicle obtained by the vicinity-of-vehicle monitor 50, or is made based on information which has been stored in advance as intersection data and which indicates the degree of visibility at the junction m2.

In the case in which it is determined that the visibility at the junction m2 located ahead of the vehicle is poor, the preceding vehicle judgment means 133 performs as follows. That is, as shown in FIG. 10, when the vehicle b1 reaches an illumination start point, that is a predetermined distance A0 (for example, 100 m) before (in advance of) the center of the junction m2, that is, when an illumination start time is reached, the information output by the forward safety monitor 48 or the vicinity-of-vehicle monitor 50 is acquired, and a determination is made, based on the monitoring information, as to whether there is a preceding vehicle in front of the vehicle b1 within a range from the current position si(Xi, Yi) of the vehicle to the junction m2. If there is no such preceding vehicle, the point-to-be-illuminated ("warning point") setting means 138 executes a point-to-be-illuminated setting routine, in which a point "a" (Xs, Ys) ("warning point") to be illuminated stored in the data storage unit 16 is read and is set. The light emission processing means 134 starts operation of the laser beam generator 53 to emit a laser beam aimed at the point "a" (Xs, Ys) to be illuminated in the junction m2.

After the laser beam is emitted toward the point "a" (Xs, Ys) to be illuminated in the junction m2 in the above-described manner, the light emission processing means 134 makes a determination, based on the current location si(Xi, Yi) of the vehicle and the point "a" (Xs, Ys) to be illuminated, as to whether the vehicle b1 has passed through the junction m2. If the vehicle b1 has passed through the junction m2, the emission of the laser beam is ended.

The process will now be described further with reference to the flow chart of FIG. 9.

In step S21, a determination is made as to whether a route has been selected in the route searching process. If a route has been selected, the process proceeds to step S22. However, if no route has been selected, the process proceeds to step S25.

In step S22, map data associated with the selected route is acquired.

In step S23, a determination is made as to whether there is a junction m2 on the selected route. If there is a junction m2 on the selected route, the process proceeds to step S24. However, if there is no junction, the process is ended.

In step S24, the junction m2 is registered.

In step S25, map data for an area around (in the vicinity of) the current position is acquired.

In step S26, the vehicle b1 is driven.

In step S27, a determination is made as to whether the visibility at the junction m2 located ahead is good. If the visibility at the junction m2 located ahead is good (poor), the process is ended. However, if the visibility is poor or "not good," the process proceeds to step S28.

In step S28, a determination is made as to whether there is a preceding vehicle. If there is no preceding vehicle, the process proceeds to step S29. However, if there is a preceding vehicle, the process is ended.

In step S29, a laser beam is emitted aimed at the point a(Xs, Ys) to be illuminated in the junction m2.

In step S30, a determination is made as to whether the vehicle has passed through the junction m2. If the vehicle has passed through the junction m2, the process proceeds to step S31. However, if the vehicle has not reached the junction m2, the process returns to step S29.

In step S31, the laser beam is turned off, and the process is ended.

In the navigation apparatus 14, if the current location is detectable with high precision using the GPS sensor 15, and the precision of the data in the database stored in data storage unit 16 is sufficiently high, the laser beam can be emitted precisely toward the point "a" (Xs, Ys) to be illuminated. However, if the precision of the current location detected using the GPS sensor 15 is not sufficiently high or the precision of the data in the database stored in data storage unit 16 is not sufficiently high, it is difficult to precisely direct the laser beam toward the point "a" (Xs, Ys) to be illuminated.

In an alternative embodiment, to avoid the problem described above, function judgment means (not shown) of the CPU 13 performs a junction judging routine to calculate an error Δs in the position si(Xi, Yi) of the user's vehicle, based on the data indicting the current location detected by the GPS sensor 15 and the monitoring information output by the forward safety monitor 48 or the vicinity-of-vehicle monitor 50, and, if the calculated error As is greater than a threshold value Δsth, the light emission processing means 134 turns off the laser beam, because sufficiently high accuracy cannot be achieved.

Although the present invention has been described above with reference to specific embodiments, the present invention is not limited to those specific embodiments described and various modifications are possible without departing from the spirit and scope of the invention.

What is claimed is:

1. A vehicle proximity warning apparatus comprising:

a current location detector for detecting a current location of a user's vehicle;

point information acquiring means for acquiring map data; and light emission processing means for driving a light generator, based on the map data and the detected current location of the user's vehicle, to emit a light beam toward a warning point to be illuminated on the road ahead; and wherein the warning point is on a road surface within an intersection, road junction or crossing.

2. The vehicle proximity warning apparatus according to claim 1, further comprising light emission angle setting means for calculating the distance from the location of the user's vehicle to the warning point and for calculating a light emission angle at each location detected as the current location of the user's vehicle, based on the calculated distance.

3. The vehicle proximity warning apparatus according to claim 2, further comprising a light emission direction adjustment means for adjusting direction of the light beam in accordance with the calculated light emission angle.

4. A vehicle proximity warning apparatus comprising:

a current location detector for detecting a current location of a user's vehicle;

point information acquiring means for acquiring map data; and light emission processing means for driving a light generator, based on the map data, and the detected current location of the user's vehicle, to emit a light beam toward a warning point to be illuminated on the road ahead; and wherein the warning point is in an intersection and further comprising intersection condition checking means for judging whether the visibility in an intersection ahead of vehicle is good, wherein the light emission processing means causes the light beam to be emitted when the visibility in the intersection is judged to be low.

5. The vehicle proximity warning apparatus according to claim 2 wherein the light emission angle setting means resets the vertical angle between the emitted light beam and the vertical and the horizontal angle between the emitted light beam and direction of travel of the user's vehicle, periodically as the distance between the user's vehicle and the warning point decreases.

6. A method for warning other vehicles and pedestrians of the proximity of a user's vehicle equipped with a light beam generator, comprising:

(a) detecting the current location of the user's vehicle;

(b) retrieving map information from a database, the retrieved map data being selected on the basis of the detected current location;

(c) determining, based on the retrieved map data and detected current location, whether or not the detected current location is within a predetermined distance from a warning point;

(d) responsive to a determination that the detected current location is within the predetermined distance, directing a light beam from the light beam generator onto the warning point to illuminate the warning point and thereby warn the other vehicles and pedestrians of the proximity of the user's vehicle approaching the warning point; and (e) repeating steps (a)-(d) and periodically redirecting the light beam, so as to maintain it focused on the prede termined warning site, as the distance between the detected current position and the warning point decreases.

7. The method according to claim 6 wherein the warning point site is an area on the road surface within an intersection, a road junction or a crossing.

8. The method according to claim 6 wherein the periodic redirecting is by resetting the vertical angle between the light beam and the vertical and the horizontal angle between the emitted light beam and direction of travel of the user's vehicle.

9. The method according to claim 6 wherein the warning point is a predetermined point included in the map data.

10. The vehicle proximity warning apparatus according to claim 1 wherein the warning point is a predetermined point included in the map data.

11. The vehicle proximity warning apparatus according to claim 2 wherein the warning point is a predetermined point included in the map data.

* * * * *